April 28, 1942. T. H. JENKINS 2,281,501
HOLDER FOR EARS OF CORN
Filed April 24, 1940
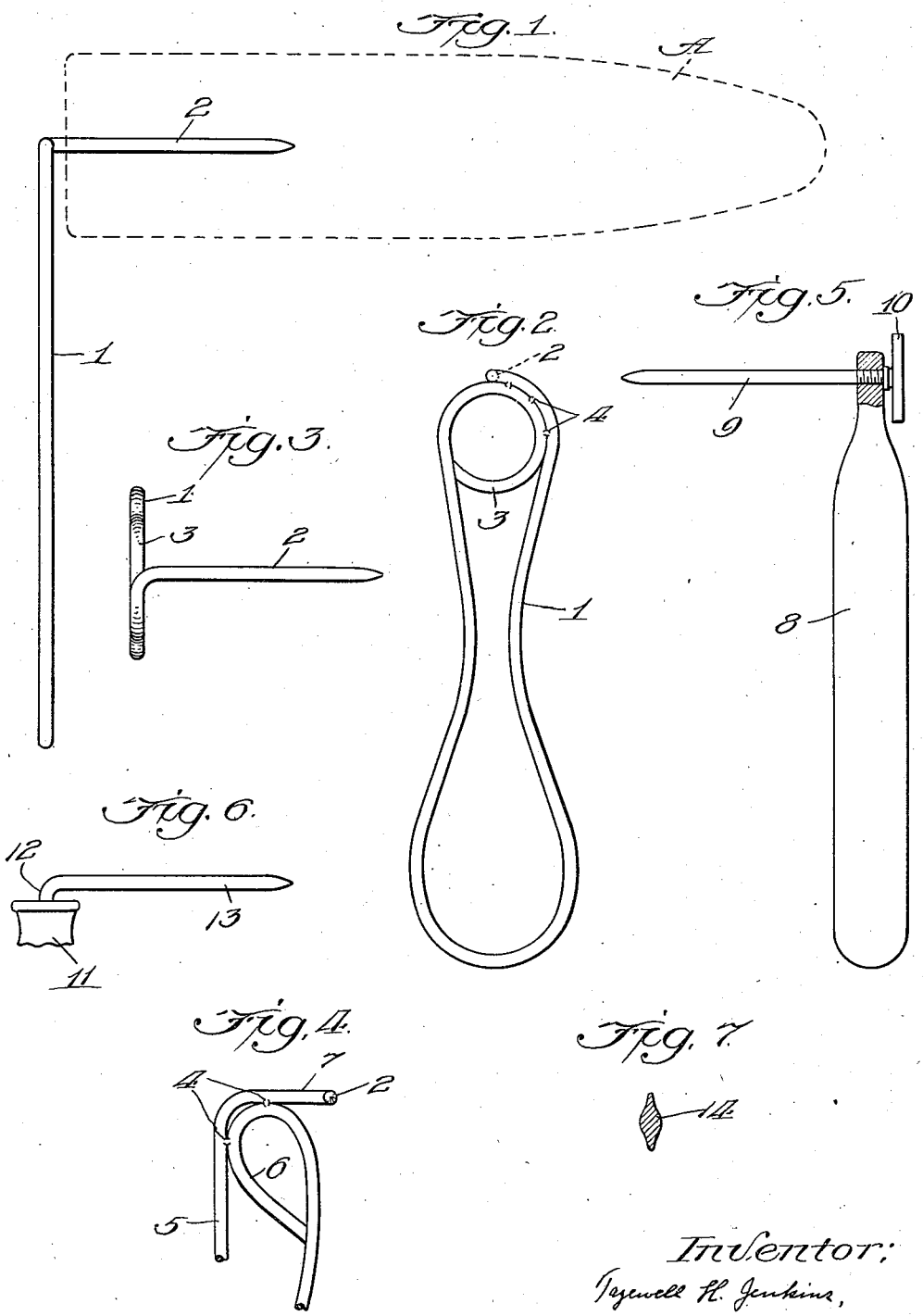

Patented Apr. 28, 1942

2,281,501

UNITED STATES PATENT OFFICE 2,281,501

HOLDER FOR EARS OF CORN

Tazewell H. Jenkins, Chicago, Ill.

Application April 24, 1940, Serial No. 331,317

4 Claims. (Cl. 294—5)

It has long been common to provide devices whereby a person may support an ear of corn without directly holding it in his hand, while eating the same. All of such devices, so far as I am aware, have been based on the principle of providing each end of the ear or cob with a handle or hand-hold; thereby requiring the use of both hands for supporting the ear, when there are individual devices employed at the two ends; and placing the handle in such a position that the butter and juices can run down on the user's hand, in cases where a handle is provided with a gripping member that spans the length of the ear. In this latter type of holder there is the further disadvantage in the fact that the prongs or spikes must be spread apart in order to permit an ear of corn to be arranged between them.

The object of the present invention is to produce a simple and novel holder for an ear of corn, which will require the use of but one hand to support the ear, will position the ear in such a position relatively to the hand that juices from the ear cannot run down upon the hand, and provide such a secure support for the ear as to eliminate all danger of the ear becoming loose and dropping off the holder.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an edge view of a holder embodying the present invention, illustrating it applied to an ear of corn which is indicated in dotted lines; Fig. 2 is a side or face view of the holder; Fig. 3 is a top plan view of the holder; Fig. 4 is a side or face view of the upper end of a slightly modified form of holder; Fig. 5 is a view similar to Fig. 1, showing a still further modification, the upper end of the handle being shown in section; Fig. 6 is a view similar to Fig. 1, showing the upper end of a still further modified form of holder; and Fig. 7 is a section through a spike member which is non-circular in order to prevent the ear from turning about the same.

Referring to Figs. 1 to 3 of the drawing, I represents a handle of a size that may conveniently be gripped in the hand and be firmly held, and 2 is a fairly long cantilever element in the form of a spike or sturdy pin projecting at right angles from one end of the handle. The spike or pin is made considerably longer than corresponding elements in ear-supporting devices adapted to support an ear from both ends. This is because the spike or pin must penetrate far enough into the ear to support the latter effectively in the manner of a cantilever. The usual short prong or pin employed in the old types of devices would not satisfactorily support an ear from one end, because of the weight of the ear alone, even without taking into consideration the forces tending to pull the ear off its support, to which an ear is subjected during the act of eating the corn therefrom.

It is advisable that the device be provided with a seat adjacent to the base end of the prong or spike, to permit the thumb of the hand in which the handle is being gripped to press against the seat and thus force the prong or spike into the ear. The simplest way of securing the device to an ear is to stand the ear on end and then press the prong or spike axially into the same from the top. The ear may be grasped in one hand, while protected by a napkin, to place and hold it in an upright position for the attachment of the holder, or suitable tongs may be provided temporarily to grip and hold each ear while a holder is being attached thereto.

The device illustrated in Figs. 1, 2 and 3 is shown as being formed from a single piece of wire bent so as to produce a flat handle in the form of a long, narrow frame; one end of the wire being bent into the shape of a ring 3 of a diameter equal to the width of the handle at that point, while the other end partially embraces this ring and then is bent laterally at right angles to the plane of the ring to form the prong or spike. Thus, the prong or spike lies adjacent to the ring which forms a good seat for the reception of the thumb of the user at the time of pressing the prong or spike into the ear. In the particular arrangement shown, the prong or spike intersects the longitudinal axis of the handle, so that the thumb rest is symmetrically disposed with respect to the same.

In order to secure the wire in the handle from spreading, the portion of one side of the frame that extends along a part of the ring 3 is preferably spot-welded thereto, as indicated at 4.

In Fig. 4 there is shown another wire handle 5 in which one end is shaped into a non-circular eye 6 which is spot-welded, as indicated at 4, to one of the side members and one of the end pieces of the frame-like part. This latter end portion, indicated at 7, extends tangentially across one end of the loop and is then bent laterally to produce the prong or spike 2. In this construction the prong or spike lies at or beyond one edge of the flat handle instead of at the longitudinal axis.

In Fig. 5 the device is provided with a handle 8 which may be of the size of an ordinary knife handle. The prong or spike 9 is shown as screwed through one end of the handle and being held in place by means of a lock nut provided with a large flat head 10 which constitutes, also, a seat against which the thumb may be pressed while forcing the prong or spike into the ear.

In Fig. 6 there is shown a construction in which there is a handle 11, similar to a knife handle, into which extends a tang 12 projecting from one end of and at right angles to the prong or spike 13. By constructing the parts so that the prong or spike lies close to the end of the handle, that end of the handle may serve to receive the pressure of the thumb, in applying the holder to an ear, without providing any separate seat.

When the prong or spike is round, the ear can turn to bring new rows of corn in position to be eaten, thereby permitting the hand that holds the corn to remain in the same position while all of the kernels are being eaten. If it be preferred to prevent the ear from turning, the prong or spike may be given a cross-sectional shape that is non-circular. Thus, for example, in Fig. 7, there is shown in cross section a prong or spike that is bulbous at the center and merges into fins or veins projecting therefrom in opposite directions. Such a prong or spike will prevent any turning of the ear thereon during the process of eating the corn.

It will thus be seen that I have produced a simple and novel holder for an ear of corn, which makes it easy for the user to avoid soiling his hands or fingers when eating corn from the cob, which will firmly and securely support the ear of corn, and which may be attached and detached quickly and easily. Also, since the ear of corn need not be touched by the hands or fingers, there is no danger of burning the latter when the corn is piping hot as it should be.

While I have illustrated and described with particularity only the single preferred form of my invention, with a few modifications, I do not desire to be limited to the exact structural details thus illustrated and described, but intend to cover all forms and arrangements which come within the definitions of my invention constituting the appended claims.

I claim:

1. A device of the character described, consisting of a single handle adapted to be gripped in the hand, and a long sturdy spike projecting laterally from one end of the handle and adapted to be inserted in one end of an ear of corn and support the entire weight of the same by a cantilever action, said device having adjacent to the base end of the spike a large seat or bearing for engagement by the ball of the thumb of the user to force the spike into the said ear.

2. A device of the character described formed from a piece of wire bent into a handle having the shape of a long, narrow, flat frame, one end of the wire being looped inwardly at one end of the frame, and the other end of the wire being bent to project laterally from said end of and at right angles to the plane of the frame.

3. A device of the character described formed from a piece of wire bent into a handle having the shape of a long, narrow, flat frame, one end of the wire being looped inwardly at one end of the frame, and the other end of the wire being bent to project laterally from said end of and at right angles to the plane of the frame, the looped portion of the wire being welded to other portions of the wire.

4. A device of the character described, consisting of a single handle adapted to be gripped in the hand, and a long sturdy spike secured to one end of and projecting laterally from the handle, and a bearing seat of considerable area on the handle at the base end of the spike adapted to be engaged by the thumb of the hand holding the handle in order to force the spike into an end of an ear of corn.

TAZEWELL H. JENKINS.